(12) United States Patent
Angell et al.

(10) Patent No.: US 10,686,224 B2
(45) Date of Patent: Jun. 16, 2020

(54) BATTERY WITH ALUMINUM-CONTAINING CATHODE

(71) Applicants: C. Austen Angell, Mesa, AZ (US); Leigang Xue, Austin, TX (US)

(72) Inventors: C. Austen Angell, Mesa, AZ (US); Leigang Xue, Austin, TX (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 40 days.

(21) Appl. No.: 15/956,630

(22) Filed: Apr. 18, 2018

(65) Prior Publication Data
US 2018/0309170 A1    Oct. 25, 2018

Related U.S. Application Data

(60) Provisional application No. 62/487,406, filed on Apr. 19, 2017.

(51) Int. Cl.
| | | |
|---|---|---|
| *H01M 10/39* | (2006.01) | |
| *H01M 2/16* | (2006.01) | |
| *H01M 4/38* | (2006.01) | |

(52) U.S. Cl.
CPC ....... *H01M 10/399* (2013.01); *H01M 2/1646* (2013.01); *H01M 2/1686* (2013.01); *H01M 4/381* (2013.01); *H01M 2300/0057* (2013.01)

(58) Field of Classification Search
CPC ....... H01M 10/399; H01M 2300/0065; H01M 4/0407; H01M 4/00; H01M 4/463
See application file for complete search history.

(56) References Cited

U.S. PATENT DOCUMENTS

| | | |
|---|---|---|
| 5,484,670 A | 1/1996 | Angell et al. |
| 5,506,073 A | 4/1996 | Angell et al. |
| 5,786,110 A | 7/1998 | Angell et al. |
| 5,824,433 A | 10/1998 | Angell et al. |
| 5,849,432 A | 12/1998 | Angell et al. |
| 5,855,809 A | 1/1999 | Angell et al. |
| 5,962,169 A | 10/1999 | Angell et al. |

(Continued)

FOREIGN PATENT DOCUMENTS

| | | |
|---|---|---|
| CA | 2098870 A1 | 12/1993 |
| EP | 0576225 B1 | 12/1998 |

(Continued)

OTHER PUBLICATIONS

Benato et al, "Sodium Nickel Chloride Battery Technology for Large-Scale Stationary Storage in the High Voltage Network," Journal of Power Sources. 293, pp. 127-136, Oct. 20, 2015.

(Continued)

*Primary Examiner* — Stewart A Fraser
(74) *Attorney, Agent, or Firm* — Fish & Richardson P.C.

(57) ABSTRACT

A battery includes an anode chamber configured to contain an anolyte and including an anode, a cathode chamber configured to contain a catholyte including a cathode, and a separator between the anode chamber and the cathode chamber. The anode includes sodium, and the cathode includes aluminum. The battery is configured to be operated above a melting point of the anolyte and the catholyte, such that the anolyte is a molten anolyte and the catholyte is a molten catholyte.

11 Claims, 5 Drawing Sheets

(56) References Cited

U.S. PATENT DOCUMENTS

| | | |
|---|---|---|
| 6,245,465 B1 | 6/2001 | Angell et al. |
| 7,012,124 B2 | 3/2006 | Angell et al. |
| 7,504,473 B2 | 3/2009 | Angell et al. |
| 7,527,899 B2 | 5/2009 | Angell et al. |
| 7,833,643 B2 | 11/2010 | Angell et al. |
| 7,833,666 B2 | 11/2010 | Angell et al. |
| 7,867,658 B2 | 1/2011 | Angell et al. |
| 8,273,477 B2 | 9/2012 | Angell et al. |
| 9,647,288 B2 | 5/2017 | Angell et al. |
| 9,768,462 B2 | 9/2017 | Angell et al. |
| 2006/0189776 A1 | 8/2006 | Angell et al. |
| 2008/0226989 A1 | 9/2008 | Angell et al. |
| 2009/0226817 A1 | 9/2009 | Angell et al. |
| 2011/0020712 A1 | 1/2011 | Angell et al. |
| 2011/0143212 A1 | 6/2011 | Angell et al. |
| 2015/0318586 A1* | 11/2015 | Rahmane ............ H01M 4/661 429/104 |
| 2016/0043431 A1 | 2/2016 | Angell et al. |
| 2016/0308253 A1* | 10/2016 | Robins ............ H01M 4/381 |
| 2017/0309943 A1* | 10/2017 | Angell ............ H01M 8/188 |
| 2019/0020060 A1 | 1/2019 | Angell et al. |

FOREIGN PATENT DOCUMENTS

| | | |
|---|---|---|
| MX | 183199 | 11/1996 |
| WO | 1996039725 A1 | 12/1996 |
| WO | 1997016862 A1 | 5/1997 |
| WO | 1997018159 A1 | 5/1997 |
| WO | 1997018595 A1 | 5/1997 |
| WO | 1999019932 A1 | 4/1999 |
| WO | 2001096446 A1 | 12/2001 |
| WO | 2001098396 A1 | 12/2001 |
| WO | 2001099209 A2 | 12/2001 |
| WO | 2004114445 A1 | 12/2004 |
| WO | 2006078866 A2 | 7/2006 |
| WO | 2008118210 A2 | 10/2008 |
| WO | 2009042958 A1 | 4/2009 |
| WO | 2014028894 A1 | 2/2014 |
| WO | 2014153146 A1 | 9/2014 |
| WO | 2016044324 A1 | 3/2016 |

OTHER PUBLICATIONS

Berg et al, "Phase-Diagram of the NaCl—AlCl3 System Near Equimolar Composition, With Determination of the Cryoscopic Constant, the Enthalpy of Melting, and Oxide Contaminations," Inorganic Chemistry, 23, 5, pp. 557-565, 1984.

Bones et al, "Development of a Ni,NiCl2 Positive Electrode for a Liquid Sodium (ZEBRA) Battery Cell," J. Electrochem. Soc., 136, 5, pp. 1274-1277, May 1989.

Dewing, "Thermodynamics of the System NaCl—AlCl3," Metallurgical Transactions B-Process Metallurgy 12, 4, pp. 105-719, Dec. 1981.

Dustmann, "Advances in ZEBRA batteries," Journal of Power Sources, 127, 1, pp. 85-92, Mar. 2004.

Ellis et al, "Sodium and Sodium-Ion Energy Storage Batteries," Current Opinion in Solid State and Materials Science, 16, 4, pp. 168-177, Aug. 2012.

Li et al, "Liquid Metal Electrodes for Energy Storage Batteries," Advanced Energy Materials, 2016, 6, pp. 1-19, May 2016.

Lu et al, "Liquid-metal electrode to enable ultra-lowtemperature sodium-beta alumina batteries for renewable energy storage," Nature Communications, 5, 8, pp. 1-8, Aug. 2014.

Mohandas et al, "An Electrochemical Investigation of the Thermodynamic Properties of the NaCl—AlCl3 System at SubliquidusTemperatures," Metallurgical and Materials Transactions B, 32, 4, pp. 669-677 Aug. 2001.

Tucker et al, "Approaches to, and Problems with, Ionic Liquid Electrolytes for Alkali Metal Electrochemical Devices: The Case ofLow-Melting Chloroaluminate Binary Solutions," J. Electrochem Soc., 161, 12, pp. H796-H801, Sep. 4, 2014.

Wang et al, "Lithium-antimony-lead liquid metal battery forgrid-level energy storage," Nature 514, pp. 348-350, Oct. 16, 2014.

Xue et al, "Ionic Liquid Redox Catholyte for High Energy Efficiency,Low-Cost Energy Storage," Advanced Energy Materials, 5, 12, pp. 1-8, Apr. 17, 2015.

* cited by examiner

FIG. 5A
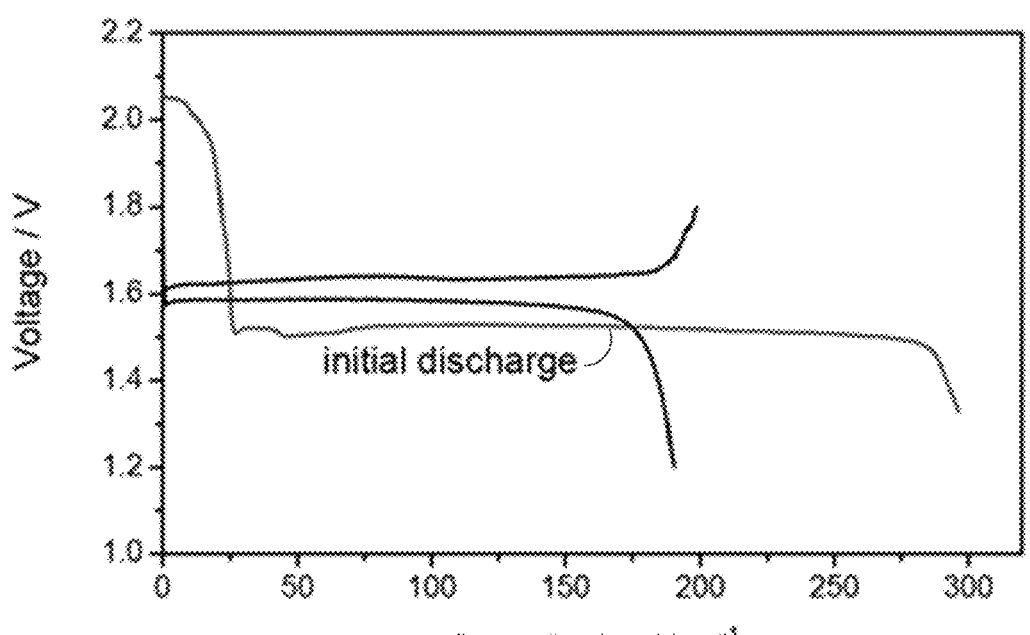
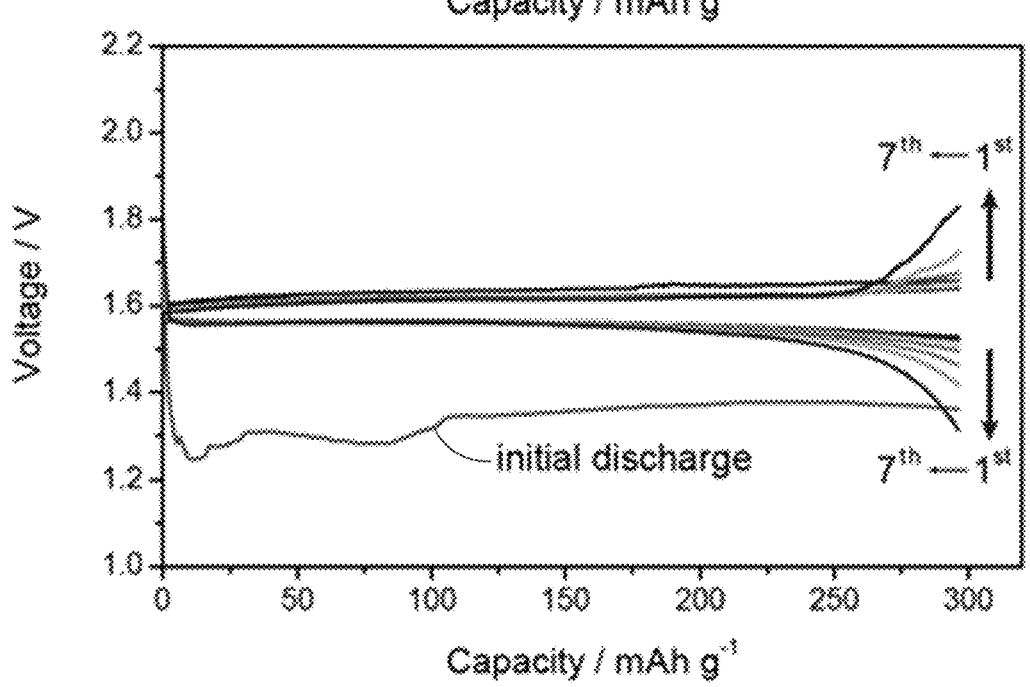
FIG. 5B

BATTERY WITH ALUMINUM-CONTAINING CATHODE

CROSS-REFERENCE TO RELATED APPLICATION

This application claims the benefit of U.S. Patent Application No. 62/487,406 entitled "BATTERY WITH ALUMINUM CATHODE" and filed on Apr. 19, 2017, which is incorporated by reference herein in its entirety.

STATEMENT OF GOVERNMENT INTEREST

This invention was made with government support under 1111357 awarded by the Department of Energy. The government has certain rights in the invention.

TECHNICAL FIELD

This disclosure relates to batteries having an aluminum-containing cathode.

BACKGROUND

When a cathode including aluminum is used in a battery with an aqueous electrolyte, hydroxide and oxide anions generated at the anode can react with the aluminum to form a passivating aluminum oxide layer. In some cases, an electric field can draw anions through an aluminum oxide layer on the cathode, growing the oxide layer into as well as away from the surface of an electrode. Thus, the use of aluminum in cathodes can be hindered by the inability of cathodes to provide reversible insertion of aluminum ions.

SUMMARY

In a first general aspect, a battery includes an anode chamber configured to contain an anolyte and including an anode, a cathode chamber configured to contain a catholyte including a cathode, and a separator between the anode chamber and the cathode chamber. The anode includes sodium, and the cathode includes aluminum. The battery is configured to be operated above a melting point of the anolyte and the catholyte, such that the anolyte is a molten anolyte and the catholyte is a molten catholyte.

Implementations of the first general aspect may include one or more of the following features.

The anode may consist of sodium or consist essentially of sodium. The anolyte includes sodium, consists of sodium, or consists essentially of sodium. During operation of the battery, the anode and the anolyte may both be molten sodium.

In some cases, the cathode includes $NaAl_2Cl_7$. The catholyte typically includes $NaAl_2Cl_7$. The catholyte may include $AlCl_3$. In some cases, the catholyte includes $EMIAlCl_4$, where $EMIAlCl_4$ is a compound of 1-ethyl-3-methylimidazolium chloride and $AlCl_3$.

The separator includes a solid sodium super ionic conductor. In some cases, the solid sodium ion conductor includes a porous coating of an electronically conductive metal oxide (e.g., indium tin oxide) proximate the anode chamber.

The cathode chamber may include aluminum wool. The aluminum wool is in direct contact with the separator, and the catholyte is in direct contact with the aluminum wool and the separator.

Charging the battery typically results in the formation of sodium, and discharging the battery typically results in the formation of aluminum.

BRIEF DESCRIPTION OF THE DRAWINGS

FIG. 5A shows discharge and charge curves of a Na—Al battery at 0.1 C with $NaAl_2Cl_7$ catholyte. FIG. 5B shows discharge and charge curves of a Na—Al battery at 0.2 C with $NaAl_2Cl_7$-$EMIAlCl_4$ (4:1 mole ratio) catholyte.

DETAILED DESCRIPTION

Figure 1:
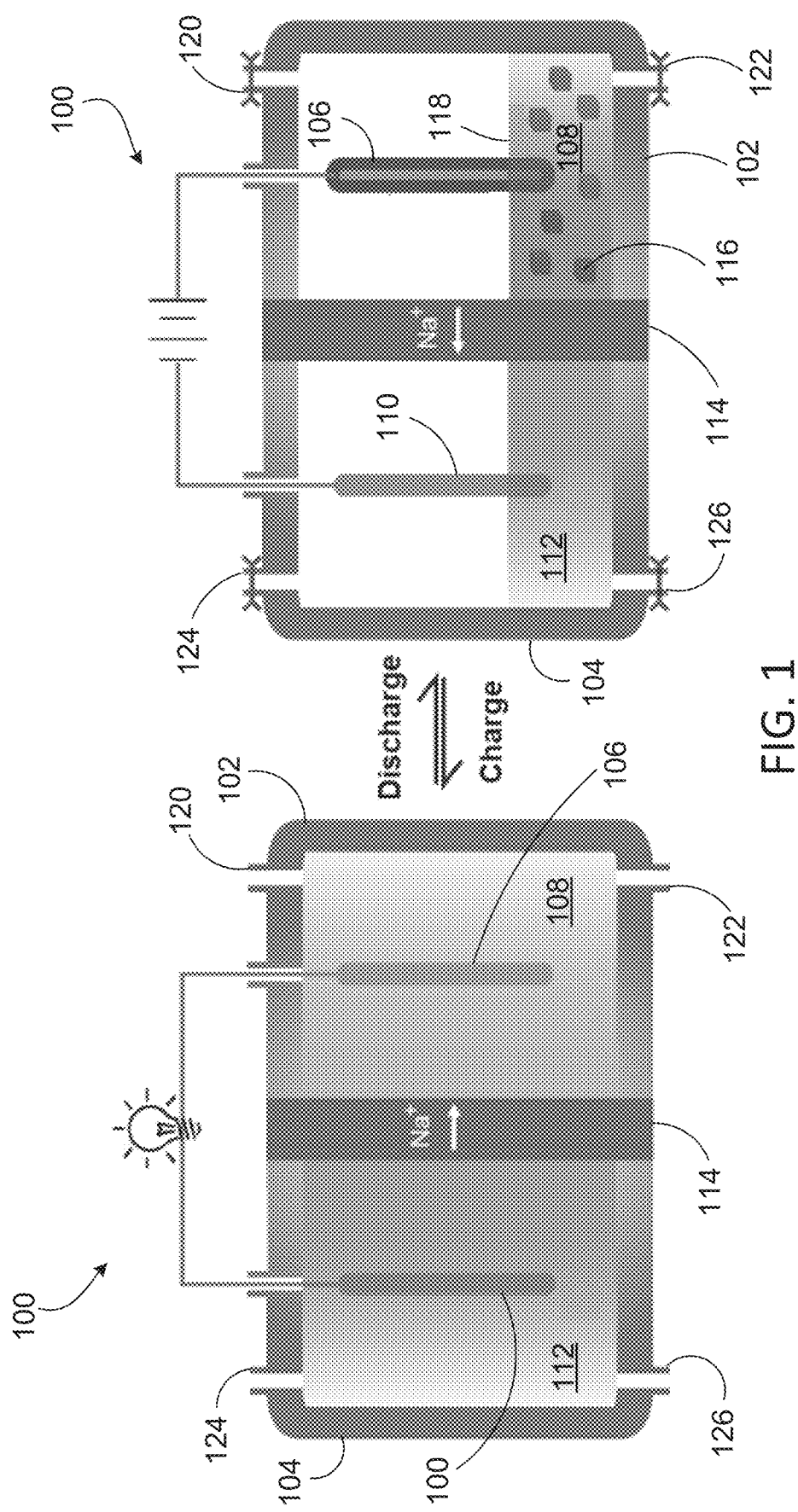
FIG. 1 depicts charging and discharging of a Na—Al battery with an aluminum cathode.

FIG. 1 depicts charging and discharging of a sodium (Na)-aluminum (Al) battery with an aluminum-containing cathode. Battery 100 includes cathode chamber 102 and anode chamber 104. Cathode chamber 102 includes cathode 106 and catholyte 108. Anode chamber 104 includes anode 110 and anolyte 112. Cathode 102 includes aluminum. In one example, cathode 102 and catholyte 108 include $NaAl_2Cl_7$, and anode 106 and anolyte 112 include molten sodium. In some cases (e.g., during discharge), at least one of cathode 102 and catholyte 108 includes $NaAl_2Cl_7$ and $NaAlCl_4$. Cathode chamber 102 and anode chamber 104 are separated by solid sodium ion conductor 114. In one example, sodium ion conductor 114 is a sodium super ionic conductor (NaSICON), which typically refers to a family of solids with the chemical formula $Na_{1+x}Zr_2Si_xP_{3-x}O_{12}$, $0<x<3$.

Non-aqueous media such as ionic liquids and molten salts can be free of oxygen, such that cathode 106 in battery 100 does not form a surface oxide film during operation. Aluminum has relatively low electropositivity compared to alkali metal anodes. For an aluminum-containing material to be suitable as a cathode, it should be capable of supporting reversible plating and stripping of aluminum metal, and a compatible electrolyte is needed to support alkali ion migration to and from anode chamber 102 to maintain charge balance. $NaAl_2Cl_7$ (mole ratio of $AlCl_3$:NaCl=2:1), a combination of $AlCl_3$ and NaCl, may be used as catholyte 108. In one example, catholyte 108 is $NaAl_2Cl_7$ and anolyte 112 is molten sodium. At least one of $NaAlCl_4$ and NaCl may be present in catholyte as solids 116 and 118, respectively. In the charged state, both the catholyte and the anolyte are liquid. During the discharge, the liquid volume of anolyte 112 and catholyte 108 decreases, as solid NaCl and Al metal are produced. In the recharge process, solid NaCl and Al metal return to the molten sodium and molten $NaAl_2Cl_7$ respectively. Battery 100 may be recharged with fresh catholyte 108 and fresh anolyte 112 via inlet and outlet valves 120, 122 and 124, 126, respectively.

The voltage output of a Na—Al battery such as that depicted in FIG. 1 was found to be 1.55 V in a molten salt medium. This is close to, but smaller than, the value calculated from the standard free energy change for the process $3Na+AlCl_3=3NaCl+Al$ of 1.80 V at 25° C. The battery can be operated at 200° C. to overcome ceramic separator kinetics and to keep sodium and $NaAl_2Cl_7$ in the molten state. The sodium anolyte and NaAl₂Cl₇ catholyte together showed a high energy density of 366 Whkg⁻¹, with a voltage of about 1.55 V. The high energy density, low-cost and internal safety make this chemistry applicable to the large scale energy storage market.

Figure 2:
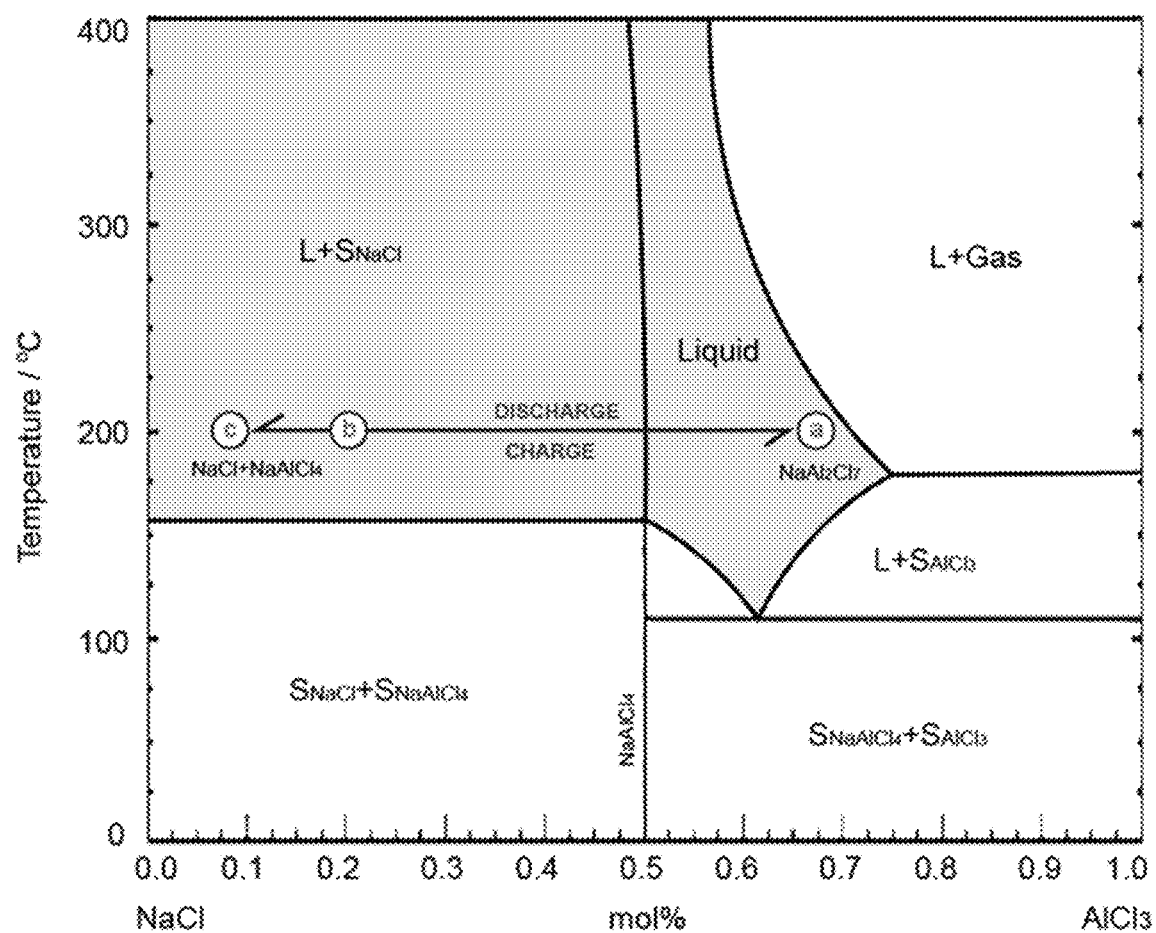
FIG. 2 depicts a NaCl—$AlCl_3$ phase diagram.

According to the NaCl—AlCl₃ phase diagram depicted in FIG. 2, NaCl and AlCl₃ can combine in the solid state up to 158° C. as NaAlCl₄, while the homogeneous liquid state can persist down to about 110° C., a eutectic temperature, near the composition NaAl₂Cl₇. Beyond the eutectic composition, it is pure AlCl₃ (solid at low temperatures and vapor above 185° C.) that is the phase in equilibrium with the liquid. NaAl₂Cl₇ as catholyte provides for a higher capacity than NaAlCl₄ because of a higher Al content, so is typically preferable. To ensure that the aluminum in NaAlCl₄, $T_m$=158° C., participates in the cell reaction, the cell was tested at 200□ in initial experiments, as suggested by the line "abc" on the phase diagram. At this temperature, NaAl₂Cl₇ is maintained in liquid state and no AlCl₃ gas will be produced. FIG. 2 depicts the composition and state change of the NaAl₂Cl₇ catholyte during discharge and charge at 200° C. Overcharge, to the right of point a (NaAl₂Cl₇), produces AlCl₃ at pressures greater than 1 atm.

Battery 100 is typically assembled in a charged state, thus the first stage of a cycle is a discharge. NaAl₂Cl₇ will transform to NaAlCl₄ first (point "a" to point "b" in FIG. 2), as shown in equation (1).

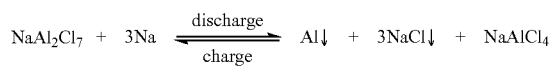

(1)

after which the composition on the phase diagram is NaCl:AlCl₃=4:1 or 20 mol % AlCl₃. NaAlCl₄ then becomes the catholyte, which can continue the discharge as shown in equation (2).

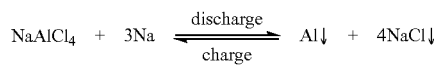

(2)

Therefore, the total cell reaction is:

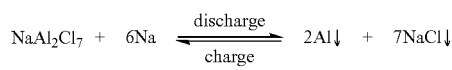

(3)

The theoretical capacity of the NaAl₂Cl₇ catholyte can be expressed as the number of coulombs generated per gram (g) of active material C=nF/M (M the molecular weight in g), but is more commonly reported as the time needed to pass this charge as a current (1 amp=1 coulomb/second) in units, such as hours of time at mA current, so that:

$C=nF/M$ coulombs g⁻¹=$nF/M$ Amp-sec g⁻¹=$nF/M×$
1000/3600 mAhg⁻¹   (4)

Substitution of n=6, F=96,500, and M=325.5 g, yields C=494 mAhg⁻¹.

It may be preferable that the aluminum in the NaAl₂Cl₇ catholyte not be fully deposited, such that liquid NaAlCl₄ is present to serve as the electrolyte for Na⁺ flux in the subsequent re-charge process. That is, according to the phase diagram in FIG. 2, this second step discharge does not reach pure NaCl, but can stop at point "c." Therefore, the practical capacity of this catholyte is understood to be lower than 494 mAhg₋₁.

Figure 3:
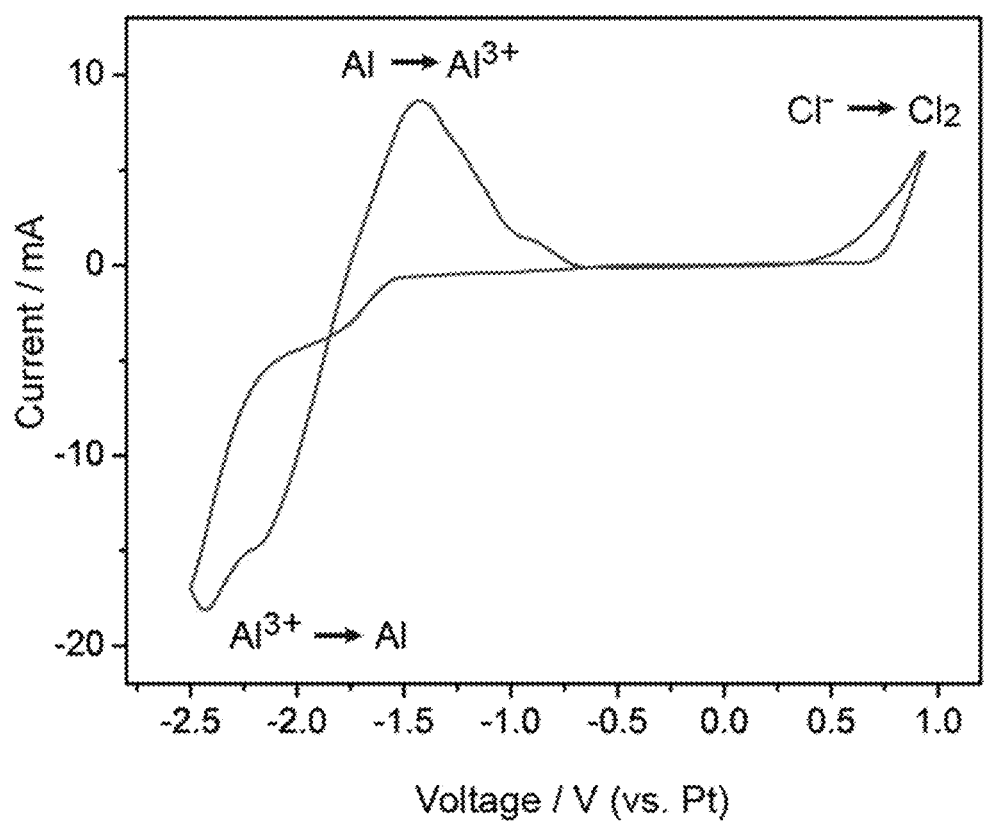
FIG. 3 shows cyclic voltammograms of $NaAl_2Cl_7$ catholyte.

FIG. 3 shows electrochemical behavior of NaAl₂Cl₇ in the form of cyclic voltammograms taken at T=200° C., with a platinum reference electrode, and a scan rate of 10 mVs⁻¹. The scan covers the potential range that includes the reduction to metallic aluminum at the negative extreme and the oxidation of chloride ion to chlorine gas at the positive extreme. The redox process for the Al/Al(III) couple is reversible.

Figure 4:
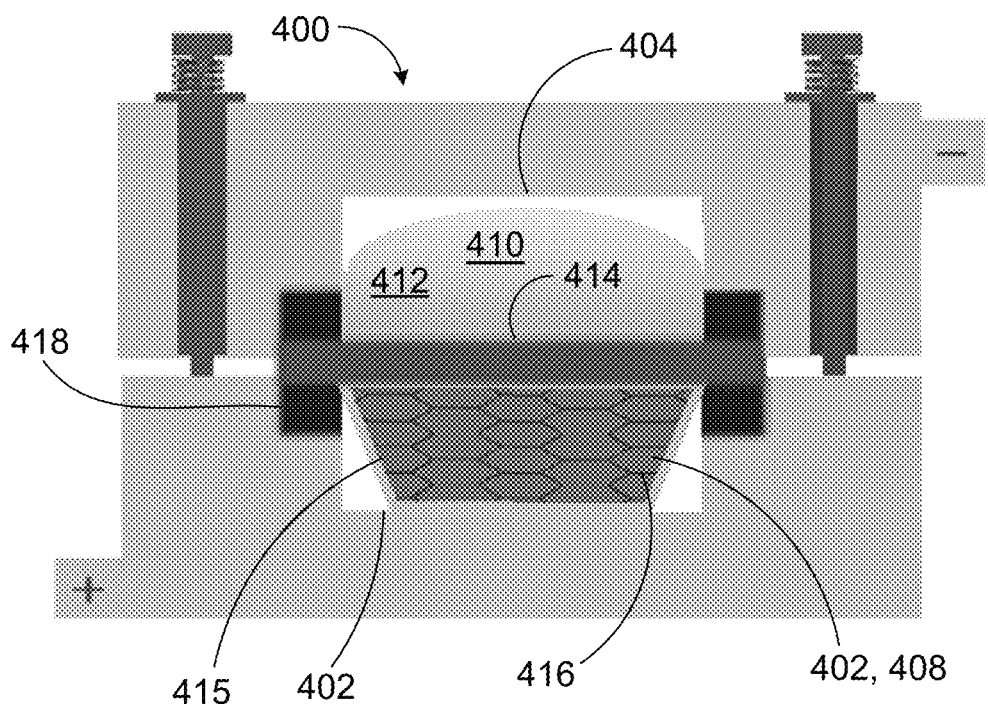
FIG. 4 depicts a battery with an aluminum-containing cathode.

A Na—Al battery was constructed as depicted in FIG. 4. Battery 400 includes cathode chamber 402 and anode chamber 404. Cathode chamber 402 includes cathode 406 and catholyte 408. Anode chamber 404 includes anode 410 and anolyte 412, both of which are molten. Sodium ion conductor 414 separates cathode chamber 402 and anode chamber 404. Cathode 402 and catholyte 408, initially NaAl₂Cl₇, were contained with aluminum foil 415. Anolyte 412 was placed above sodium ion conductor (separator) 414, which was optionally coated with an electronically conductive metal oxide (e.g., indium tin oxide) to improve wettability, and catholyte 408 (NaAl₂Cl₇), absorbed in aluminum wool 416, was placed below the sodium ion conductor. Aluminum wool 416 served as a current collector and also has wicking effect to allow catholyte 408 to contact sodium ion conductor 414. Cathode chamber 402 and anode chamber 404 were sealed with gasket 418.

Working at 200° C., discharge and charge behaviors at 0.1 C were recorded and are shown in FIGS. 5A and 5B for a Na—Al battery at 0.1 C with NaAl₂Cl₇ catholyte and NaAl₂Cl₇-EMIAlCl₄ (4:1 mole ratio) catholyte, respectively, where EMIAlCl₄ is a mixture of 1-ethyl-3-methylimidazolium chloride and AlCl₃. The capacity is calculated on the basis of the mass of NaAl₂Cl₇. After a short initial high voltage stage, the discharge voltage dropped and stabilized at about 1.5 V. When 296 mAhg⁻¹ had been delivered, corresponding to 59.9% of the available Al being used, the discharge voltage dropped to about 1.3 V. At this point, the composition in the cathode chamber was NaAlCl₄, NaCl, and Al. After the battery was recharged, the voltage was about 1.63 V. The solid NaCl that formed during discharge did not establish sufficient contact with the remaining NaAlCl₄ for the charging process to regenerate all the initial liquid NaAl₂Cl₇. A second discharge curve yielded a smaller capacity.

Figure 6:
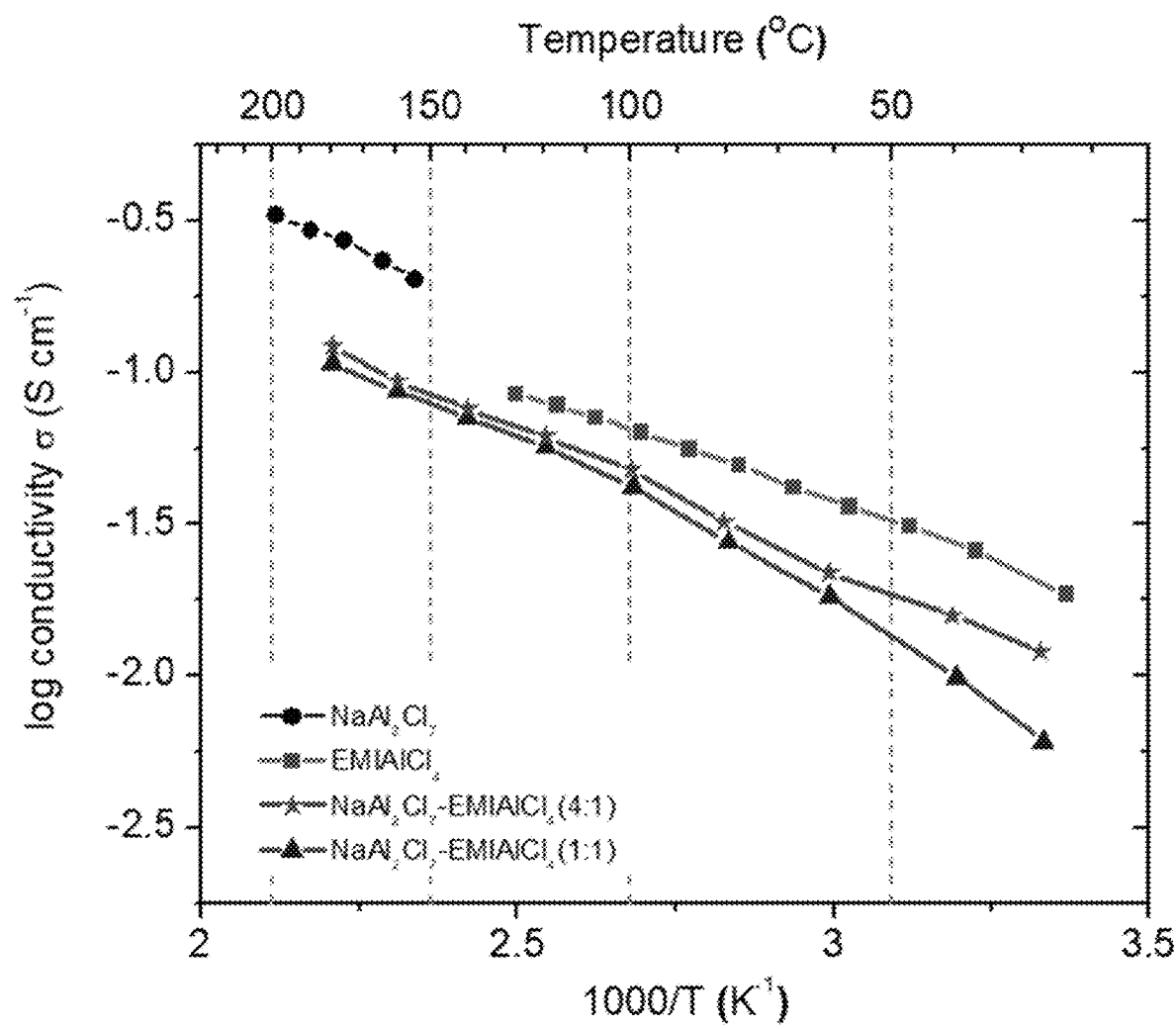
FIG. 6 shows specific conductivities of $NaAl_2Cl_7$, $EMIAlCl_4$ and their mixtures.

In some implementations, a low-melting component such as the "ionic liquid" EMIAlCl₄ is added to the electrolyte to increase the liquid volume and improve wetting. EMIAlCl₄ is inactive in the charge/discharge process and the aluminum in it generally cannot be deposited. It is in the liquid state, but causes the conductivity of the NaAl₂Cl₇-EMIAlCl₄ (mole ratio 4:1) mixture to become lower than for pure NaAl₂Cl₇ due at least in part to an alkali cation trapping phenomenon, as shown in FIG. 6. FIG. 6 shows specific conductivities of NaAl₂Cl₇, EMIAlCl₄, and their mixtures. All data from three consecutive runs coincided within measurement uncertainty. The addition of EMIAlCl₄ contributes toward a lower melting point of NaAl₂Cl₇.

An improved charge/discharge profile with this catholyte is shown in FIG. 5B. The voltage during the initial discharge is around 1.3 V, but in the following charge-discharge, the discharge and charge voltages are 1.56 V and 1.63 V, respectively, which are the same as with the pure NaAl₂Cl₇ battery (FIG. 5A), and the capacity is higher (>300 mAhg⁻¹, >61% Al usage) for the second and third cycles. The energy efficiency (product of Coulomb and voltage efficiencies) is high, about 95.7%.

In some implementations, the discharge is limited to a shallow value such that the cell process can be described by the equation $$4NaAl_2Cl_7 + 3Na \underset{\text{charge}}{\overset{\text{discharge}}{\rightleftharpoons}} Al\downarrow + 7NaAlCl_4 \quad (5)$$

in which no solid NaCl is generated.

Some implementations include, in the cathode chamber, a supply of an adduct of $AlCl_3$ with some appropriate (molecular) base chosen to maintain the activity of $AlCl_3$ at about the same value as that in liquid $NaAl_2Cl_7$. This effectively buffers the electrolyte against NaCl precipitation and removes the volume change in the electrolyte from cell design consideration. The cell design can be modified to use a minimum electrolyte volume, and the capacity can be determined by the amount of $AlCl_3$ in the adduct. The $AlCl_3$ adduct, unlike NaCl, would be a soft solid that would readily release $AlCl_3$ to the electrolyte to maintain an optimum activity for Al deposition. To minimize the effect on the capacity, the base may have a low molecular weight, and may be inorganic. The cell reaction may reduce to the transfer of $AlCl_3$ to the electrolyte as $NaAl_2Cl_7$ to accommodate the in-migration of $Na^+$, effectively making the cell reaction $$3Na+AlCl_3=Al+3NaCl \quad (6)$$

coupled with the acid-base process using $AlCl_3$ from the bank, viz., $$3NaCl+6AlCl_3=3NaAl_2Cl_7 \quad (7)$$

to maintain the liquid state of the electrolyte at 110° C., and give an overall cell reaction $$3Na+7AlCl_3=Al+3NaAl_2Cl_7 \quad (8)$$

Alternatively, it could be $$3Na+4AlCl_3=Al+3NaAlCl_4 \quad (9)$$

if a higher operating temperature (T>158° C.) is used.

The mass of $AlCl_3$ needed to keep the NaCl in the low temperature (chloroaluminate) liquid state at constant $AlCl_3$ activity is included in the cell capacity calculation. Using an $AlCl_3$ storage bank can simplify the cell design because the volume change (formerly entirely residing in the electrolyte) is shared with the volume change in the $AlCl_3$ bank.

Table 1 provides a comparison with the lithium-ion battery and Na—$NiCl_2$ (ZEBRA) battery. The theoretical energy density can be obtained as the product of cell capacity in Coulombs per gram of active material from the cell equation and cell voltage, $E=QV/M=nF/M\times V$, where the units will be $Jg^{-1}$, but is usually expressed in units of $Whkg^{-1}$, and obtained from the product of cell voltage and capacity, the latter expressed in the practical units of $mAhg^{-1}$. Thus the theoretical energy density, assuming the cell voltage remains steady at the observed value of 1.6 V until all Al is consumed, would be 494 $mAhg^{-1}\times 1.60$ V (the average of charge and discharge voltages) or 790 $Whkg^{-1}$. However, as seen in FIG. 5B, only 60% of the theoretical capacity is realized. Thus, the experimental energy density is $790\times 0.6=480$ $Whkg^{-1}$, which is close to that of the lithium ion battery (608 $Whkg^{-1}$, based on active cathode mass alone). The ZEBRA battery has a high theoretical capacity (787 $Whkg^{-1}$), but this value would be lower if one were to take the liquid $NaAlCl_4$ electrolyte into account in the calculation. Moreover, because of slow diffusion within the solid $NiCl_2$ formed on the nickel surface, only a part of Ni can be utilized.

TABLE 1

Comparisons among three kinds of batteries.

| | Li-ion battery | Na—$NiCl_2$ battery | Na—Al battery |
|---|---|---|---|
| Cathode (capacity) | $LiFePO_4$ (170 $mAhg^{-1}$) | $NiCl_2$ (414 $mAhg^{-1}$) | $NaAl_2Cl_7$ (296 ≤ C < 494 $mAhg^{-1}$) |
| Anode (capacity) | graphite (372 $mAhg^{-1}$) | sodium (1165 $mAhg^{-1}$) | sodium (1165 $mAhg^{-1}$) |
| Electrolyte | $LiFP_6$ in organic solvent | $NaAlCl_4$ | $NaAl_2Cl_7$ and $NaAlCl_4$ |
| Separator | polymer | $Na^+$ solid conductor | $Na^+$ solid conductor |
| Theoretical capacity (based on cathode and anode) | 117 $mAhg^{-1}$ | 305 $mAhg^{-1}$ | 236 ≤ C < 347 $mAhg^{-1}$ |
| Voltage | 3.4 V | 2.58 V | 1.55 V |
| Energy density | 398 $Whkg^{-1}$ | 787 $Whkg^{-1}$ | 366 ≤ E < 538 $Whkg^{-1}$ |
| Working temperature | room temperature | 270-350° C. | about 200° C. |
| Safety | dendrite problem and organic electrolyte | Safe | Safe |
| Cost of materials | cheap | cheaper | cheapest |
| Replenishable | no | no | yes |

For the Na—Al cell, both the sodium and aluminum are earth-abundant and inexpensive. It should therefore be much cheaper than the lithium-ion battery, and in view of the greater cost of Ni over Al, it should also be cheaper than the ZEBRA battery. In the charged state, both the catholyte and the anolyte are liquid, so they can be replaced after the performance degrades without discarding the whole battery. This would offer a further cost advantage over other battery types. Concerning safety, if the $Na^+$ conducting separator should crack, sodium would react with $NaAl_2Cl_7$, to form NaCl and Al, being in this respect as safe as the ZEBRA battery.

In summary, molten $NaAl_2Cl_7$ can serve as a catholyte and can deliver a high capacity of 296.4 $mAhg^{-1}$ at 60% depth of discharge; a 1.55 V discharge voltage, which is higher than expected from aqueous solution potential data, can be obtained with the molten salt medium. $NaAl_2Cl_7$ as catholyte and molten sodium as anolyte yields a high energy efficiency Na—Al battery. Its high energy density, low cost, high safety, and replenishable reserves make the Na—Al battery particularly promising in the grid-storage market.

Experimental

Materials and catholyte preparation: NaCl, anhydrous $AlCl_3$ and 1-ethyl-3-methylimidazolium chloride (EMICl), were purchased from Sigma-Aldrich. Al wool was purchased from Lustersheen. NaSICON was supplied gratis by Ceramatec. The preparation of the $NaAl_2Cl_7$ and $EMIAlCl_4$ mixed electrolyte was achieved by mixing of NaCl, $AlCl_3$ and EMICl according to the molar ratio needed. The mixing of $AlCl_3$ and NaCl cannot produce a liquid $NaAl_2Cl_7$ until the temperature is raised above the liquidus temperature, about 158° C. After cooling down, solid $NaAl_2Cl_7$ (a mixture of $NaAlCl_4$ and $AlCl_3$ according to the phase diagram) was obtained and ground into powder for later use.

The electrochemical property of the catholyte was investigated by cyclic voltammetry (CV) using a potentiostat/galvanostat (Princeton Applied Research, VMP2). A three-electrode cell was employed with platinum as the working and counter electrodes, as well as the reference electrode. The scan was made at 200° C. with a scan rate of 10 mV $s^{-1}$.

Conductivity determinations: Conductivities of $NaAl_2Cl_7$, $EMIAlCl_4$, and their mixtures were surveyed using twin platinum wire dip-type electrodes sealed into a stainless steel threaded caps that were screwed onto glass vials containing the samples loaded under argon in a drybox. Data were taken using a PAR VMP2 potentiostat (Princeton Applied Research) in the frequency range 10-100K Hz, during slow heating from ambient to 200° C.

The battery depicted in FIG. 4 is a planar design utilizing flat viton gaskets to seal the anode and cathode chambers. To overcome the problems of ceramic wetting by liquid alkali metal, a light sputtering of indium-tin oxide (ITO) was used to reduce the surface tension and allow spreading of the sodium anode on the separator during an initial exposure of the anode compartment to 300° C. The sodium was placed on the top to get good wetting of the NaSICON. Al wool, to serve as the current collector, was pressed into a pellet to fill in the cathode chamber. It also provides a wicking effect that ensures effective catholyte contact with the NaSICON separator. During the assembly, solid $NaAl_2Cl_7$ and liquid $EMI-AlCl_4$ at room temperature were placed on the top of the Al pellet and heated to 200° C. to melt $NaAl_2Cl_7$ and allow them to be absorbed into the wool. An Al foil bowl was used to keep the liquid in place. The anode and cathode compartments were then joined and sealed, via insulated bolts and a second viton gasket, and the unit mounted in a controlled temperature oven for testing. After the temperature stablized at 200° C., the battery test was commenced, using a battery test system from LAND Electronics Co.

Only a few implementations are described and illustrated. Variations, enhancements and improvements of the described implementations and other implementations can be made based on what is described and illustrated in this document.

What is claimed is:

1. A battery comprising:
an anode chamber comprising an anode, wherein the anode comprises sodium;
a cathode chamber comprising a cathode, wherein the cathode comprises aluminum; and
a separator between the anode chamber and the cathode chamber,
wherein:
the anode chamber contains an anolyte,
the cathode chamber contains a catholyte, wherein the catholyte comprises a 4:1 molar ratio of $NaAl_2Cl_7$ and 1-ethyl-3-methylimidazolium chloride (EMI-$AlCl_4$), and
the battery is configured to be operated above a melting point of the anolyte and the catholyte, such that the anolyte is a molten anolyte and the catholyte is a molten catholyte.

2. The battery of claim 1, wherein the anolyte comprises sodium.

3. The battery of claim 1, wherein the separator comprises a solid sodium super ion conductor.

4. The battery of claim 3, wherein the solid sodium ion conductor comprises a porous coating of an electronically conductive metal oxide proximate the anode chamber.

5. The battery of claim 4, wherein the electronically conductive metal oxide comprises indium tin oxide.

6. The battery of claim 1, wherein the cathode chamber comprises aluminum wool in direct contact with the separator, and the catholyte is in direct contact with the aluminum wool and the separator.

7. The battery of claim 1, wherein charging the battery results in the formation of sodium.

8. The battery of claim 1, wherein discharging the battery results in the formation of aluminum.

9. The battery of claim 1, wherein the anode comprises molten sodium.

10. The battery of claim 1, wherein the cathode comprises molten $NaAl_2Cl_7$.

11. A battery comprising:
an anode chamber comprising an anode, wherein the anode comprises sodium;
a cathode chamber comprising a cathode, wherein the cathode comprises aluminum; and
a separator between the anode chamber and the cathode chamber,
wherein:
the anode chamber contains an anolyte,
the cathode chamber contains a catholyte, wherein the catholyte comprises a 4:1 molar ratio of $Na_2Al_2Cl_7$ and 1-ethyl-3-methylimidazolium chloride (EMI-$AlCl_4$),
the cathode chamber comprises aluminum wool in direct contact with the separator, and the catholyte is in direct contact with the aluminum wool and the separator, and
the battery is configured to be operated above a melting point of the anolyte and the catholyte, such that the anolyte is a molten anolyte and the catholyte is a molten catholyte.

* * * * *